United States Patent
Lu

(10) Patent No.: US 9,118,622 B2
(45) Date of Patent: Aug. 25, 2015

(54) METHOD AND SERVER FOR SENDING AND LENDING DIGITAL SERVICE CONTENT

(71) Applicant: Huawei Technologies Co., Ltd., Shenzhen (CN)

(72) Inventor: Yi Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 13/773,313

(22) Filed: Feb. 21, 2013

(65) Prior Publication Data

US 2013/0332576 A1    Dec. 12, 2013

(30) Foreign Application Priority Data

Apr. 26, 2012  (CN) .......................... 2012 1 0126039

(51) Int. Cl.
*G06F 15/16* (2006.01)
*H04L 29/08* (2006.01)
*H04L 29/06* (2006.01)

(52) U.S. Cl.
CPC ............... *H04L 67/02* (2013.01); *H04L 63/10* (2013.01); *H04L 2463/101* (2013.01)

(58) Field of Classification Search
USPC ...................... 709/219; 705/26.1; 726/4, 7, 28
See application file for complete search history.

(56) References Cited

U.S. PATENT DOCUMENTS

| | | | |
|---|---|---|---|
| 2006/0075455 A1 | 4/2006 | Koch et al. | |
| 2007/0283420 A1* | 12/2007 | Rantalahti | 726/4 |
| 2009/0260067 A1* | 10/2009 | Racabi | 726/7 |
| 2012/0203648 A1* | 8/2012 | Rothschild | 705/26.1 |

FOREIGN PATENT DOCUMENTS

| | | |
|---|---|---|
| CN | 101355569 A | 1/2009 |
| CN | 101527731 A | 9/2009 |
| CN | 101610256 A | 12/2009 |
| CN | 102655533 A | 9/2012 |
| KR | 100793022 B1 | 1/2008 |

* cited by examiner

*Primary Examiner* — Kyung H Shin
(74) *Attorney, Agent, or Firm* — Brinks, Gilson & Lione

(57) ABSTRACT

The present invention provides a method and a server for sending and lending digital service content. The method for sending digital service content includes: receiving, by a server, a user request, in which the user request carries a user identifier and a label of the digital service content; determining a type of the label; if the label is a lending label of the digital service content, acquiring a borrower identifier in the lending label; and determining whether the user identifier is the same as the borrower identifier; if the user identifier is the same as the borrower identifier, acquiring a lending period matching the borrower identifier in the lending label, and determining whether the digital service content is in the lending period; if yes, sending the digital service content to a terminal used by a user and identified by the user identifier.

20 Claims, 9 Drawing Sheets

METHOD AND SERVER FOR SENDING AND LENDING DIGITAL SERVICE CONTENT

CROSS-REFERENCE TO RELATED APPLICATIONS

This application claims priority to Chinese Patent Application No. 201210126039.9, filed on Apr. 26, 2012, which is hereby incorporated by reference in its entirety.

FIELD OF THE INVENTION

The present invention relates to the field of communications technologies, and in particular, to a method and a server for sending and lending digital service content.

BACKGROUND OF THE INVENTION

Nowadays, the online network has been integrated into people's life, and the online digital goods become more and more popular, such as movies, books, and video games. While the goods are still in their original physical forms, users always borrow the goods or give the goods as gifts, for example, lending a book to a friend or gifting a music compact disc (compact disc, referred to as CD in the following) to a friend. However, at present those activities can no longer be easily done for copyrighted digital goods.

There are mainly two methods for lending or gifting the existing copyrighted digital goods.

(1) A user purchases digital goods and then performs installation and authorization on the device of a friend by using the account of the user.

(2) Print or record the digital goods into a physical form and then lend it to a friend or gift it to a friend.

However, there are safety hazards in the method of installation and authorization on the device of a friend by using the account of the user. In addition, after the digital service content is lent to others, the copyright of the digital service content can no longer be controlled, which adversely affects the digital copyright management.

SUMMARY OF THE INVENTION

The present invention provides a method and a server for sending and lending digital service content, to implement the lending of digital service content in an electronic fashion and perform copyright control for the digital service content after the digital service content is lent.

On one aspect, the present invention provides a method for sending digital service content, which includes:

receiving, by a server, a user request, in which the user request carries a user identifier and a label of the digital service content;

determining, by the server, a type of the label;

if the label is a lending label of the digital service content, acquiring, by the server, a borrower identifier in the lending label of the digital service content; and determining whether the user identifier is the same as the borrower identifier;

if the user identifier is the same as the borrower identifier, acquiring, by the server, a lending period matching the borrower identifier in the lending label of the digital service content, and determining whether the digital service content is in the lending period; and if the digital service content is in the lending period, sending, by the server, the digital service content to a terminal used by a user and identified by the user identifier.

On another aspect, the present invention provides a method for lending digital service content, which includes:

receiving, by a server, a content lending request, in which the content lending request carries an owner label of digital service content requested to be lent, the owner label includes an identifier of an owner that has the right to use and lend the digital service content, an identifier of the digital service content, and the lendable number of times of the digital service content;

after determining that the lendable number of times of the digital service content is in an effective range, receiving, by the server, a borrower identifier specified by the owner and a lending period matching the borrower;

generating, by the server, a lending label of the digital service content according to the identifier of the owner, the borrower identifier specified by the owner, the identifier of the digital service content, and the lending period matching the borrower identifier; and sending, by the server, the lending label to the borrower.

On yet another aspect, the present invention provides a server, which includes: a receiving module, a first determination module, an acquisition module, and a sending module; in which:

the receiving module is configured to receive a user request, in which the user request carries a user identifier and a label of digital service content;

the first determination module is configured to determine a type of the label; and determine whether the user identifier is the same as a borrower identifier after the acquisition module acquires the borrower identifier in the lending label of the digital service content; and determine whether the digital service content is in a lending period after the acquisition module acquires the lending period matching the borrower identifier in the lending label of the digital service content;

the acquisition module is configured to acquire the borrower identifier in the lending label of the digital service content after the first determination module determines that the label is the lending label of the digital service content; and acquire the lending period matching the borrower identifier in the lending label of the digital service content after the first determination module determines that the user identifier is the same as the borrower identifier; and the sending module is configured to send the digital service content to a terminal used by a user and identified by the user identifier after the first determination module determines that the digital service content is in the lending period.

On yet another aspect, the present invention provides a server, which includes: a request receiving module, a second determination module, an identifier receiving module, a label generation module, and a label sending module; in which:

the request receiving module is configured to receive a content lending request, in which the content lending request carries an owner label of digital service content requested to be lent, the owner label includes an identifier of an owner that has the right to use and lend the digital service content, an identifier of the digital service content, and the lendable number of times of the digital service content;

the second determination module is configured to determine that the lendable number of times of the digital service content is in an effective range;

the identifier receiving module, configured to receive a borrower identifier specified by the owner and a lending period matching the borrower identifier after the second determination module determines that the lendable number of times of the digital service content is in the effective range;

the label generation module is configured to generate a lending label of the digital service content according to the identifier of the owner, the borrower identifier specified by the owner, the identifier of the digital service content, and the lending period matching the borrower identifier;

the label sending module is configured to send the lending label generated by the label generation module to the borrower.

On one aspect, the technical effects of the present invention are that: a server receives a user request, in which the user request carries a user identifier and a label of the digital service content; if determining that the label is a lending label of the digital service content, the server determines whether the user identifier is the same as the borrower identifier included in the lending label of the digital service content; if the user identifier is the same as the borrower identifier, the server acquires a lending period matching the borrower identifier in the lending label of the digital service content, and determines whether the digital service content is in the lending period; and if the digital service content is in the lending period, the server sends the digital service content to a terminal used by a user and identified by the user identifier. Therefore, the lending of digital service content in an electronic fashion may be implemented, and the copyright control for the digital service content may be implemented after the digital service content is lent, which facilitates the digital copyright management.

On another aspect, the technical effects of the present invention are that: a server receives a content lending request, the content lending request carries an owner label of digital service content requested to be lent, the owner label includes an identifier of an owner that has the right to use and lend the digital service content, an identifier of the digital service content, and the lendable number of times of the digital service content; after determining that the lendable number of times of the digital service content is in an effective range, the server receives a borrower identifier specified by the owner and a lending period matching the borrower identifier; and then, according to the identifier of the owner, the borrower identifier specified by the owner, the identifier of the digital service content, and the lending period matching the borrower, a lending label of the digital service content is generated, and the lending label is sent to the borrower. Therefore, the lending of digital service content in an electronic fashion may be implemented, and the copyright control for the digital service content may be implemented after the digital service content is lent, which facilitates the digital copyright management.

BRIEF DESCRIPTION OF THE DRAWINGS

To make the technical solutions in the embodiments of the present invention or the prior art more clearly, the accompanying drawings used in the description of the embodiments or the prior art are briefly described hereunder. Apparently, the accompanying drawings illustrate only some embodiments of the present invention, and persons of ordinary skill in the art can derive other drawings from such accompanying drawings without creative efforts.

DETAILED DESCRIPTION OF THE EMBODIMENTS

In order to make the objectives, technical solutions, and advantages of the embodiments of the present invention more clearly, the technical solutions in the embodiments of the present invention are hereinafter described clearly and completely with reference to the accompanying drawings in the embodiments of the present invention. It is evident that the embodiments to be described are only some rather than all of the embodiments of the present invention. All other embodiments derived by persons of ordinary skill in the art from the embodiments given herein without any creative effort shall fall within the protection scope of the present invention.

Figure 1:
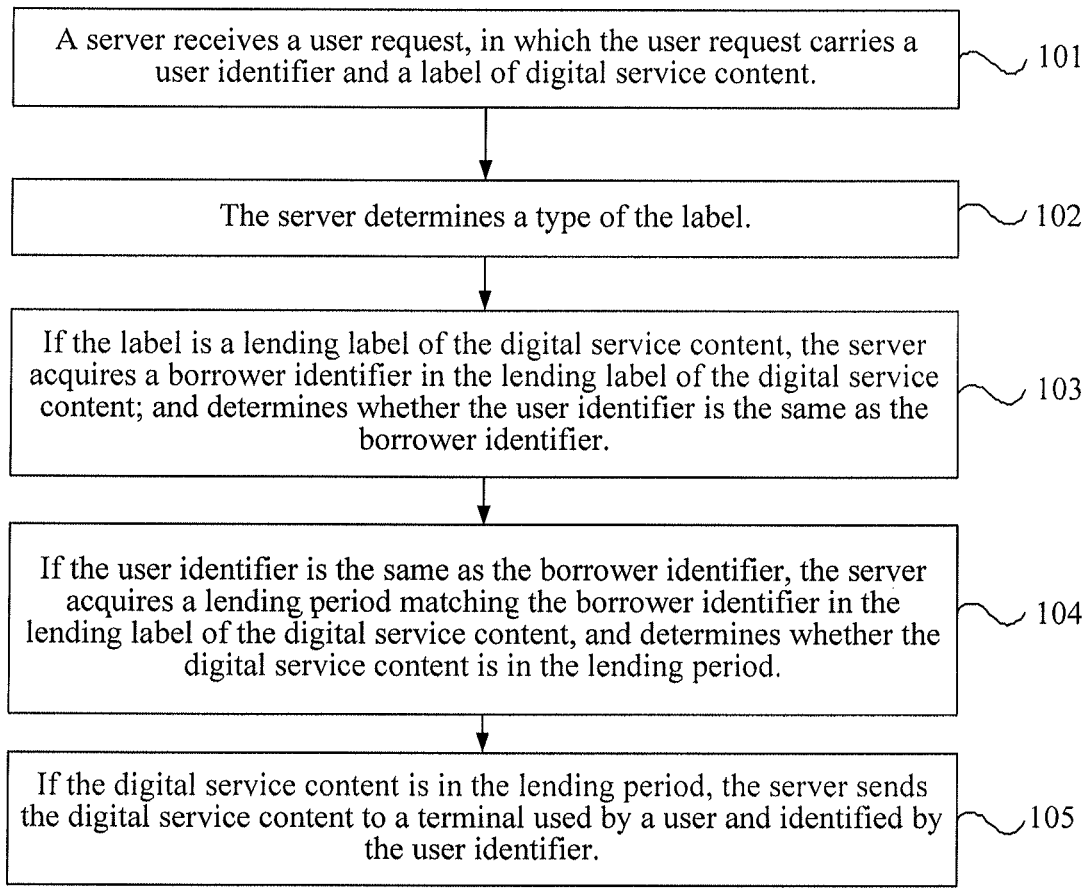
FIG. 1 is a flow chart of a method for sending digital service content according to an embodiment of the present invention.

FIG. 1 is a flow chart of a method for sending digital service content according to an embodiment of the present invention. As shown in FIG. 1, the method for sending digital service content may include the following steps.

Step 101: A server receives a user request, in which the user request carries a user identifier and a label of digital service content.

Step 102: The server determines the type of the label.

Step 103: If the label is a lending label of the digital service content, the server acquires a borrower identifier in the lending label of the digital service content; and determines whether the user identifier is the same as the borrower identifier.

Step 104: If the user identifier is the same as the borrower identifier, the server acquires a lending period matching the borrower identifier in the lending label of the digital service content, and determines whether the digital service content is in the lending period.

Step 105: If the digital service content is in the lending period, the server sends the digital service content to a terminal used by a user and identified by the user identifier.

With the embodiment, the lending of digital service content may be implemented in an electronic fashion, and the copyright control for the digital service content may be implemented after the digital service content is lent, so as to facilitate the digital copyright management.

Figure 2:
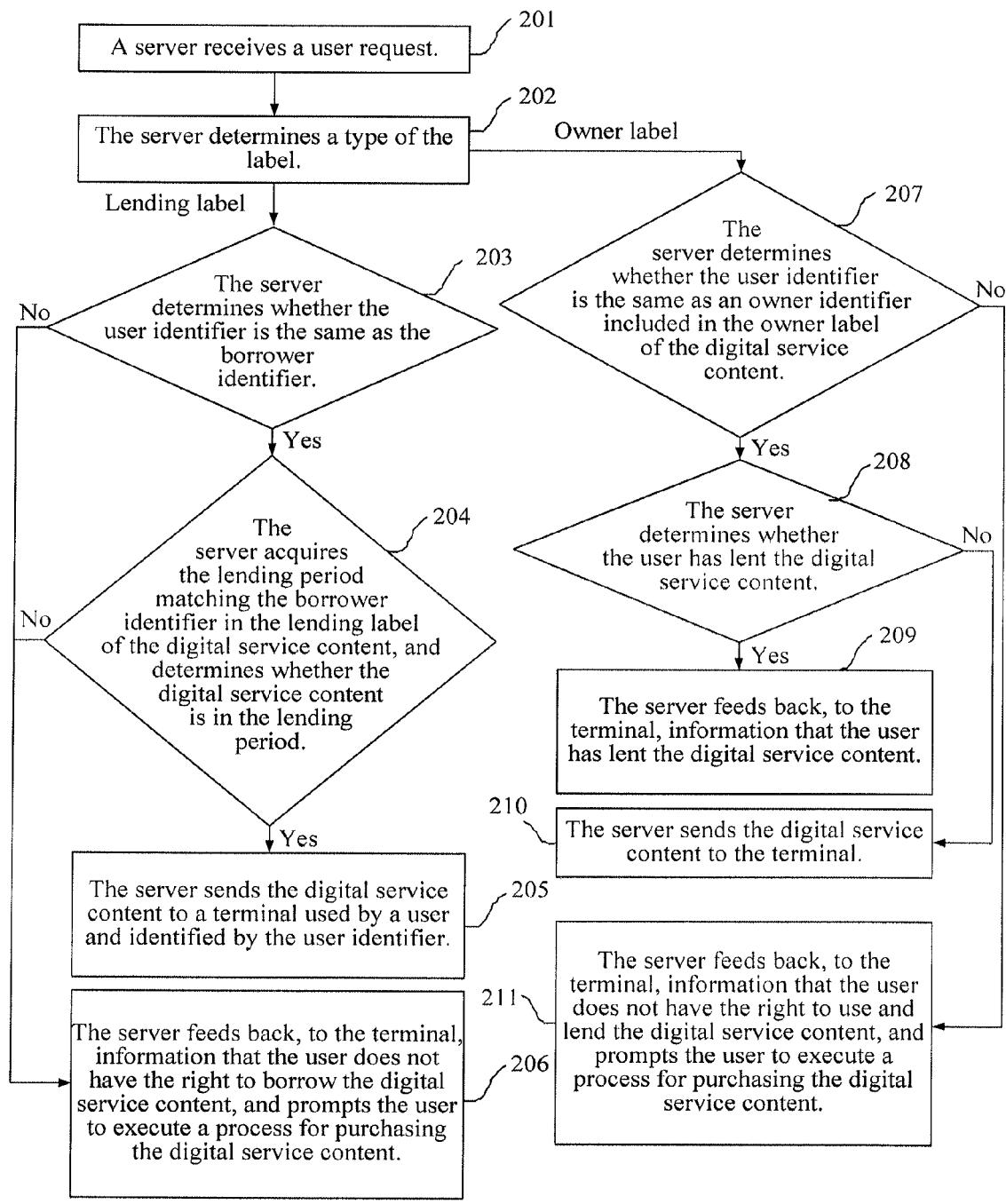
FIG. 2 is a flow chart of a method for sending digital service content according to another embodiment of the present invention.

FIG. 2 is a flow chart of a method for sending digital service content according to another embodiment of the present invention. As shown in FIG. 2, the method for sending digital service content may include the following steps.

Step 201: A server receives a user request, in which the user request carries a user identifier and a label of digital service content.

Step 202: The server determines the type of the label. If the label is a lending label of the digital service content, execute step 203; and if the label is an owner label of the digital service content, execute step 207.

Specifically, the determining the type of the label by the server may be that: the server parses the label; when the label includes the borrower identifier, the server determines that the label is the lending label of the digital service content; or determines that the label is the lending label of the digital service content when the value of a label type field in the label is a first preset value.

When the label includes an identifier of an owner that has the right to use and lend the digital service content, but does not include the borrower identifier, the server determines that the label is the owner label; or determines that the label is the owner label of the digital service content when the value of the label type field in the label is a second preset value.

The first preset value and the second preset value may be manually set during specific implementation, and the present invention does not limit what the first preset value and the second preset value are, as long as the second preset value is different from the first preset value. For example, the first preset value may be "0", whereas the second preset value may be "1". That is to say, when the value of the label type field is "0", the server may determine that the label is the lending label, and when the value of the label type field is "1", the server may determine that the label is the owner label. Alternatively, one of the first preset value and the second preset value may be set to null, and the other is not null. For example, it is assumed that the first preset value is null, the second preset value is not null. Here, it is assumed that the second preset value is "1", when the value of the label type field is null, the server may determine that the label is the lending label, and when the value of the label type field is "1", the server may determine that the label is the owner label.

In this embodiment, the user identifier may be information that can be used for identifying the identity of a user, such as a user name or a login identifier (Identifier, ID for short in the following) of the user. Similarly, the owner identifier may be information that can be used for identifying the identity of an owner, such as a user name or login ID of the owner, and the borrower identifier may be information that can be used for identifying the identity of a borrower, such as a user name or login ID of the borrower.

The present invention does not limit the specific forms of the three identifiers, namely, the user identifier, the owner identifier, and the borrower identifier. However, during specific implementation, exemplarily, the three identifiers may adopt the same form, for example, all adopt the login ID as the corresponding identifier.

Step 203: The server acquires a borrower identifier in the lending label of the digital service content, and determines whether the user identifier is the same as the borrower identifier. If the user identifier is the same as the borrower identifier, execute step 204; and if the user identifier is different from the borrower identifier, execute step 206.

In this embodiment, if the user identifier is the same as the borrower identifier, it indicates that the user and identified by the user identifier is the borrower of the digital content; and if the user identifier is different from the borrower identifier, it indicates that the user and identified by the user identifier is not the borrower of the digital content.

Step 204: The server acquires the lending period matching the borrower identifier in the lending label of the digital service content, and determines whether the digital service content is in the lending period; if yes, executes step 205; and if the digital service content is not in the lending period, executes step 206.

Step 205: The server sends the digital service content to a terminal used by a user and identified by the user identifier.

Step 206: The server feeds back, to the terminal, information that the user does not have the right to borrow the digital service content, and prompts the user to execute a process for purchasing the digital service content.

Step 207: The server determines whether the user identifier is the same as the owner identifier included in the owner label of the digital service content; if the user identifier is the same as the owner identifier included in the owner label of the digital service content, executes step 208; and if the user identifier is different from the owner identifier included in the owner label of the digital service content, executes step 211.

The owner identifier includes an identifier of an owner that has the right to use and lend the digital service content.

In this embodiment, if the user identifier is the same as the owner identifier included in the owner label of the digital service content, it indicates that the user and identified by the user identifier is an owner that has the right to use and lend the digital service content; and if the user identifier is different from the owner identifier included in the owner label of the digital service content, it indicates that the user and identified by the user identifier is not an owner that has the right to use and lend the digital service content.

Step 208: The server determines whether the user has lent the digital service content. If yes, execute step 209; and if the user has not lent the digital service content, execute step 210.

Step 209: The server feeds back, to the terminal, information that the user has lent the digital service content.

Step 210: The server sends the digital service content to the terminal.

Step 211: The server feeds back, to the terminal, information that the user does not have the right to use and lend the digital service content, and prompts the user to execute a process for purchasing the digital service content.

In this embodiment, in step 206 and step 211, after prompting the user to execute the process for purchasing the digital service content, the server may further receive a purchase request sent by the user, in which the purchase request is used for requesting purchasing the digital service content, and the purchase request carries the user identifier; and may further receive the lendable number of times of the digital service content, where the lendable number of times is set by the user: and then, the server generates the owner label of the digital service content according to the identifier of the digital service content, the lendable number of times of the digital content, and the user identifier, and stores the owner label of the digital service content in a content library of the user.

With the embodiment, the lending of digital service content may be implemented in an electronic fashion, and copyright control for the digital service content may be implemented after the digital service content is lent, so as to facilitate digital copyright management. In addition, in this embodiment, the limitation of the lending period of the lent digital service content is added. thereby enhancing the possessiveness of a purchaser and the appreciation of a borrower.

The "first" and "second" in the present invention are only for ease of description and do not represent the performance differences, the time sequence and the priority levels, which are the same hereinafter.

Figure 3A:
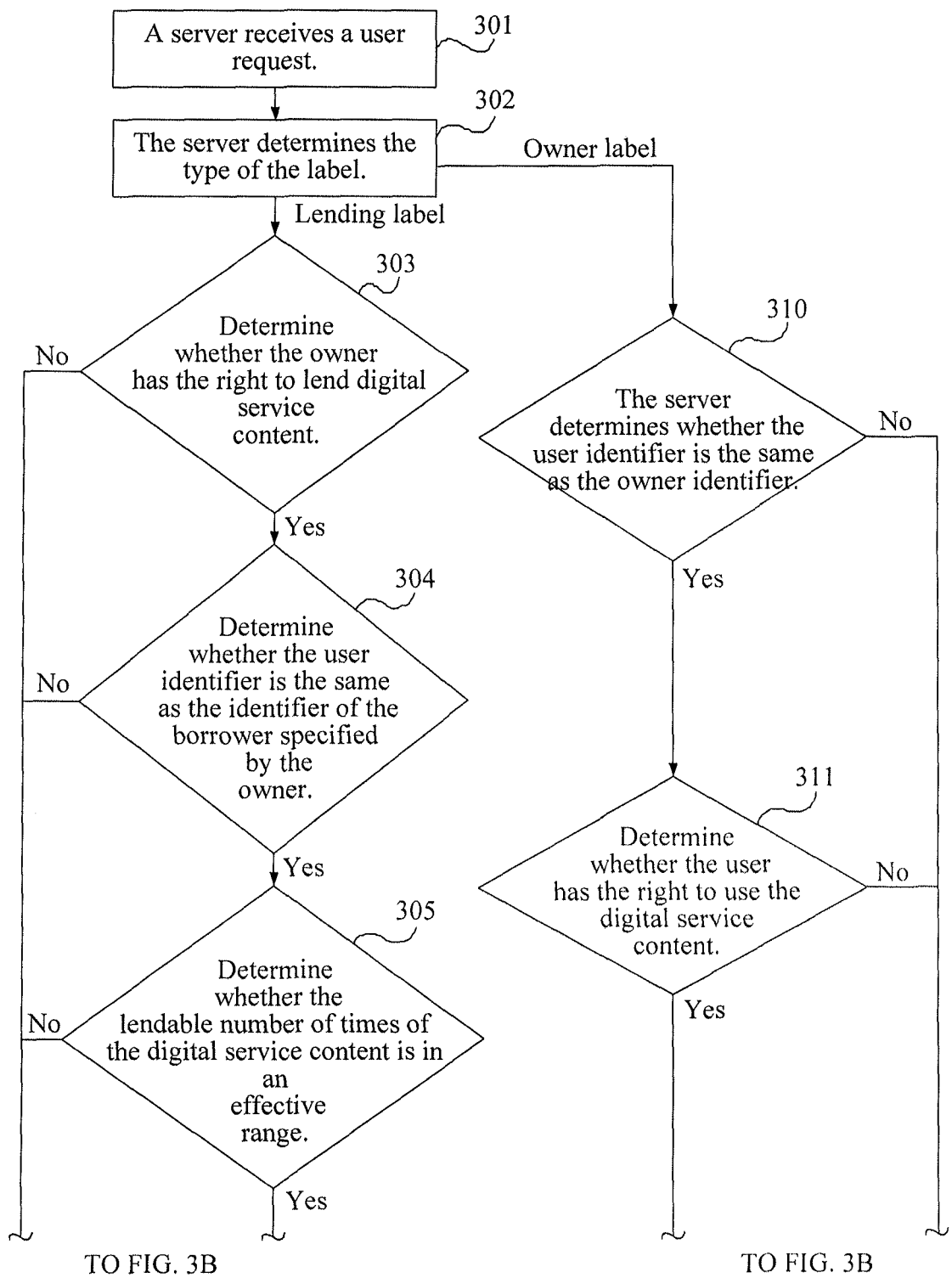
FIGS. 3A and 3B are flow charts of a method for sending digital service content according to yet another embodiment of the present invention.
Figure 3B:
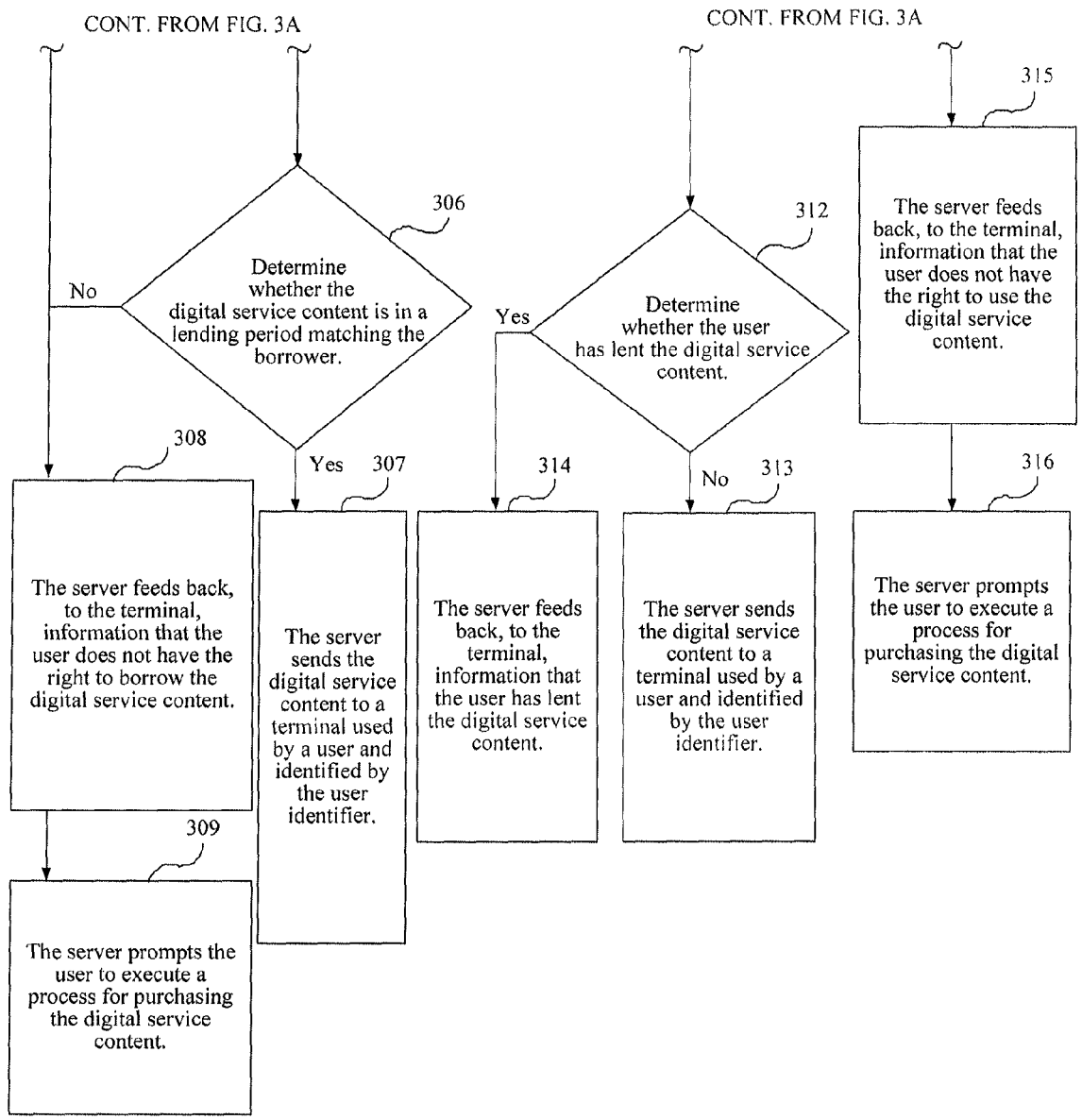

FIGS. 3A and 3B are flow charts of a method for sending digital service content according to yet another embodiment of the present invention. As shown in FIGS. 3A and 3B, the method for sending digital service content may include the following steps.

Step 301: A server receives a user request, in which the user request carries a user identifier and a label of digital service content.

In this embodiment, the user identifier may be information that can be used for identifying the identity of a user, such as a user name or login ID of the user.

Specifically, the label may be sent to the server after it is encrypted by a terminal used by the user.

Step 302: The server determines the type of the label. If the label is a lending label of the digital service content, execute step 303; and if the label is an owner label of the digital service content, execute step 310.

Specifically, the determining the type of the label by the server may be that: the server parses the label; when the label includes a borrower identifier, the server determines that the label is a lending label of the digital service content; or when the value of a label type field in the label is a first preset value, the server determines that the label is a lending label of the digital service content.

When the label includes an identifier of an owner that has the right to use and lend the digital service content but does not include the borrower identifier, the server determines that the label is an owner label; or when the value of the label type field in the label is a second preset value, the server determines that the label is an owner label of the digital service content.

The first preset value and the second preset value may be manually set during specific implementation, and the present invention does not limit what the first preset value and the second preset value are, as long as the second preset value is different from the first preset value. For example, the first preset value may be "0", whereas the second preset value may be "1". That is to say, when the value of the label type field is "0", the server may determine that the label is the lending label, and when the value of the label type field is "1", the server may determine that the label is the owner label.

Alternatively, one of the first preset value and the second preset value may be set to null, and the other is not null. For example, it is assumed that the first preset value is null, the second preset value is not null. Here, it is assumed that the second preset value is "1", when the value of the label type field is null, the server may determine that the label is a lending label, and when the value of the label type field is "1", the server may determine that the label is an owner label.

In this embodiment, the lending label of the digital service content may include the owner identifier, a borrower identifier, an identifier of the digital service content, and a lending period matching the borrower. Furthermore, the lending label of the digital service content may further include the thumbnail of the digital service content and title information of the digital service content.

In this embodiment, the owner label of the digital service content may include the owner identifier and the identifier of the digital service content. Furthermore, the owner label of the digital service content may further include the lendable number of times of the digital content, the thumbnail of the digital service content, and the title information of the digital service content.

In this embodiment, the owner identifier may be information that can be used for identifying the identity of an owner, such as a user name or login ID of the owner, and the borrower identifier may be information that can be used for identifying the identity of a borrower, such as a user name or login ID of the borrower.

The present invention does not limit the specific forms of the three identifiers, namely, the user identifier, the owner identifier, and the borrower identifier. However, during specific implementation, exemplarily, the three identifiers may adopt the same form, for example, all adopt the login ID as the corresponding identifier.

Step 303: Determine whether the owner has the right to lend the digital service content. If yes, execute step 304, and if the owner does not have the right to lend the digital service content, execute step 308.

The owner is the owner identified by the owner identifier in the lending label of the digital service content, and the digital service content is the digital service content identified by the identifier of the digital service content in the lending label of the digital service content.

Specifically, if the owner has the right to lend the digital service content, it indicates that the owner has purchased the digital service content and has the right to lend the digital service content. On the contrary, if the owner has no right to lend the digital service content, it indicates that the owner has not purchased the digital service content, or the owner has purchased the digital service content but does not have the right to lend the digital service content.

Step 304: Determine whether the user identifier is the same as the borrower identifier. If yes, execute step 305, and if the user identifier is different the borrower identifier, execute step 308.

In this embodiment, if the user identifier is the same as the borrower identifier, it indicates that the user is the borrower of the digital service content; and on the contrary, if the user identifier is different from the borrower identifier, it indicates that the user is not the borrower of the digital service content.

Step 305: Determine whether the lendable number of times of the digital service content is in an effective range. If yes, execute step 306; and if the lendable number of times of the digital service content is not in the effective range, execute step 308.

Specifically, the server may search a content library of the owner according to the owner identifier to acquire the owner label of the digital service content, and acquire the lendable number of times of the digital service content in the owner label; or, the server may also acquire the owner label corresponding to the identifier of the digital service content directly according to the identifier of the digital service content, and acquire the lendable number of times of the digital service content in the owner label.

The lendable number of times of the digital service content being in the effective range may be that the lendable number of times of the digital service content is greater than or equal to a preset threshold value; the lendable number of times of the digital service content being not in the effective range may be that the lendable number of times of the digital service content is smaller than the preset threshold value. In this embodiment, the preset threshold value may be a positive number greater than or equal to 1, and this embodiment does not limit what the preset threshold value is. Exemplarily, the preset threshold value may be 1.

Step 306: Determine whether the digital service content is in a lending period matching the borrower. If yes, execute step 307; and if the digital service content is not in the lending period matching the borrower, execute step 308.

The lending period matching the borrower is carried in the lending label of the digital service content.

Specifically, the determining whether the digital service content is in the lending period matching the borrower may be that: the server determines whether the time of receiving the lending label is in the lending period. For example, it is assumed that the lending period is from 8:00, Jan. 25, 2012 to 8:00, Feb. 1, 2012, when the time that the server receives the lending label is 12:00, Jan. 31, 2012, the server may determine that the time of receiving the lending label is in the lending period; and when the time that the server receives the lending label is 9:00, Feb. 1, 2012, the server may determine that the time of receiving the lending label is not in the lending period.

Step 307: The server sends the digital service content to a terminal used by a user and identified by the user identifier.

Step 308: The server feeds back, to the terminal, information that the user does not have the right to borrow the digital service content. Next, execute step 309.

Step 309: The server prompts the user to execute a process for purchasing the digital service content.

Step 310: The server determines whether the user identifier is the same as the owner identifier. If yes, execute step 311; and if the user identifier is different from the owner identifier, execute step 315.

The owner identifier is carried in the owner label of the digital service content. If the user identifier is the same as the owner identifier, it indicates that the user is the owner of the digital service content; and on the contrary, if the user identifier is different from the owner identifier, it indicates that the user is not the owner of the digital service content.

Step 311: Determine whether the user has the right to use the digital service content. If yes, execute step 312; and if the user does not have the right to use the digital service content, execute step 315.

The digital service content is the digital service content identified by the identifier of the digital service content in the owner label.

Specifically, if the user has the right to use the digital service content, it indicates that the owner has purchased the digital service content, and has the right to use the digital service content; and on the contrary, if the user has no right to use the digital service content, it indicates that the user has not purchased the digital service content, or although the user has purchased the digital service content, but does not have the right to use the digital service content.

Step 312: Determine whether the user has lent the digital service content. If yes, execute step 314; and if the owner has not lent the digital service content, execute step 313.

Step 313: The server sends the digital service content to a terminal used by a user and identified by the user identifier.

Step 314: The server feeds back, to the terminal, information that the user has lent the digital service content.

Step 315: The server feeds back, to the terminal, information that the user does not have the right to use the digital service content. Next, execute step 316.

Step 316: The server prompts the user to execute a process for purchasing the digital service content.

With this embodiment, the lending of digital service content may be implemented in an electronic fashion, and the copyright control for the digital service content may be implemented after the digital service content is lent, so as to facilitate the digital copyright management. In addition, in this embodiment, the limitation of the lending period and the lendable number of times of the lent digital service content is added, thereby enhancing the possessiveness of a purchaser and the appreciation of a borrower. In addition, after the purchaser has lent the digital service content, the purchaser cannot use the digital service content in the lending period, thereby enhancing the discretion of the purchaser for the lending.

Figure 4:
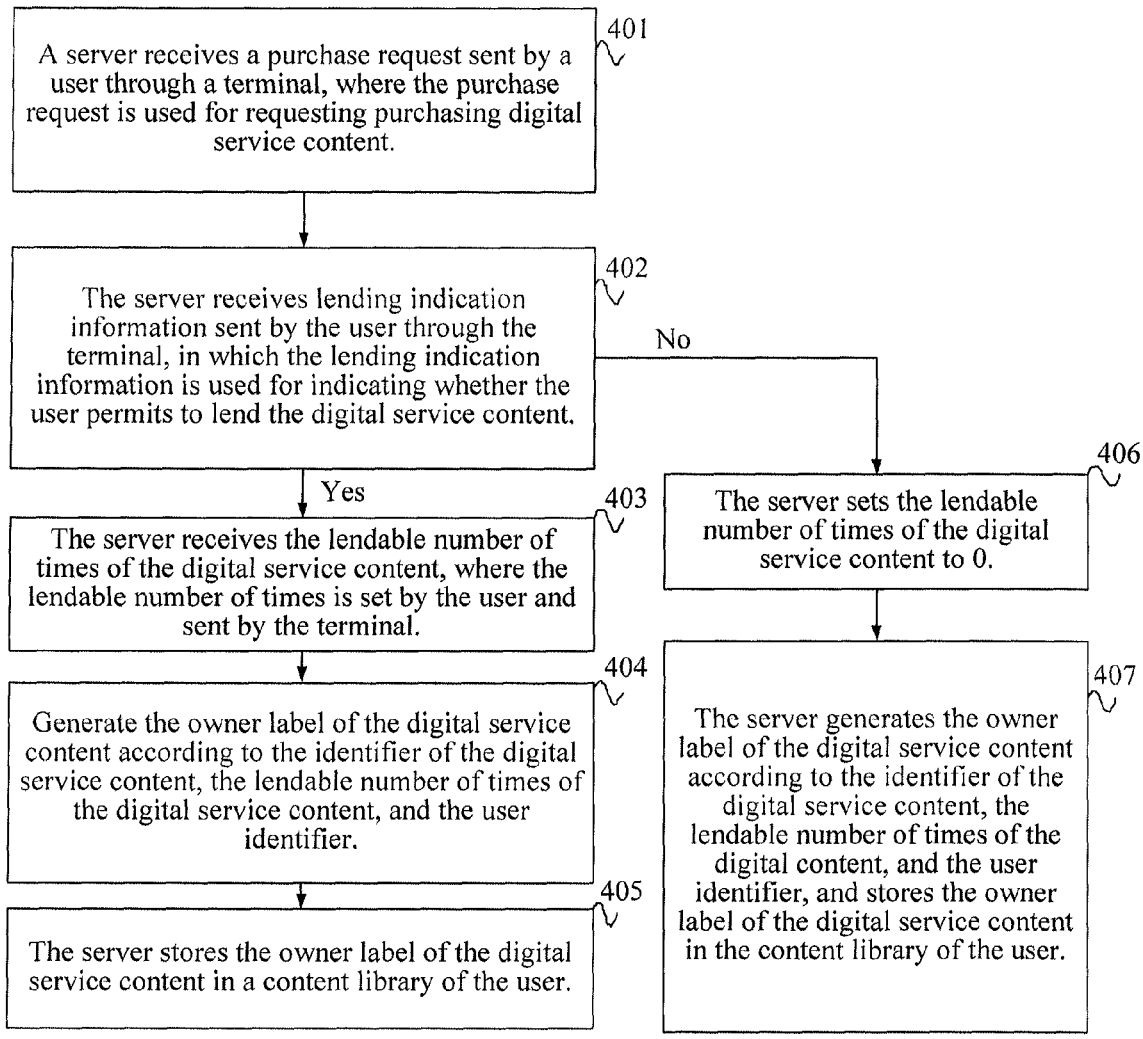
FIG. 4 is a flow chart of a method for purchasing digital service content according to an embodiment of the present invention.

FIG. 4 is a flow chart of a method for purchasing digital service content according to an embodiment of the present invention, and in this embodiment, the process of purchasing the digital service content is introduced. As shown in FIG. 4, the method for purchasing digital service content may include:

Step 401: A server receives a purchase request that is sent by a user through a terminal, where the purchase request is used for requesting purchasing digital service content, and the purchase request carries a user identifier.

In this embodiment, the user identifier may be information that can be used for identifying the identity of a user, such as a user name or login ID of the user. The present invention does not limit the specific form of the user identifier, as long as the identity of the user can be identified.

Step 402: The server receives lending indication information that is sent by the user through the terminal, in which the lending indication information is used for indicating whether the user permits to lend the digital service content.

Specifically, after the server receives the purchase request that is sent by the user through the terminal, the server may provide the terminal with a content purchase interface, so that the user can select, in the content purchase interface, whether to lend the digital service content. After the user selects whether to lend the digital service content, the terminal sends the lending indication information to the server.

In this embodiment, if the lending indication information indicates that the user permits to lend the digital service content, execute step 403; and if the lending indication information indicates that the user does not permit to lend the digital service content, execute step 406.

Step 403: The server receives the lendable number of times of the digital service content, where the lendable number of times is set by the user and is sent by the terminal.

Specifically, the user may set the lendable number of times of the digital service content through the content purchase interface provided by the server.

Step 404: Generate the owner label of the digital service content according to the identifier of the digital service content, the lendable number of times of the digital service content, and the user identifier.

In this step, the owner label of the digital service content may include the owner identifier, the identifier of the digital service content, and the lendable number of times of the digital service content; in which the owner identifier is the user identifier. Furthermore, the owner label of the digital service content may further include the thumbnail of the digital service content and the title information of the digital service content.

Step 405: The server stores the owner label of the digital service content in a content library of the user.

Step 406: The server sets the lendable number of times of the digital service content to 0.

Step 407: The server generates the owner label of the digital service content according to the identifier of the digital service content, the lendable number of times of the digital service content, and the user identifier, and stores the owner label of the digital service content in the content library of the user.

In this step, the owner label of the digital service content may include the owner identifier, the identifier of the digital service content, and the lendable number of times of the digital service content; in which the owner identifier is the user identifier. Furthermore, the owner label of the digital service content may further include the thumbnail of the digital service content and the title information of the digital service content.

With this embodiment, the purchase of the digital service content may be implemented in an electronic fashion, and the lendable number of times of the digital service content is limited during the purchase of the digital service content, so that the control of the lendable number of times of the digital service content may be implemented, thereby facilitating digital copyright management and enhancing the possessiveness of a purchaser and the appreciation of a borrower.

Figure 5:
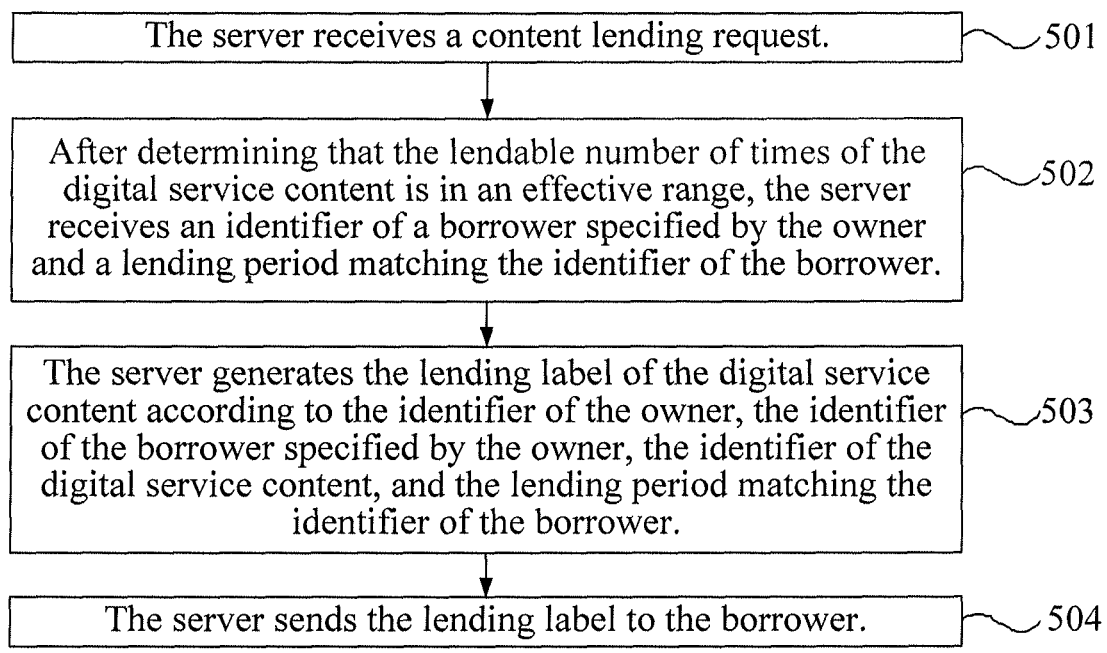
FIG. 5 is a flow chart of a method for lending digital service content according to an embodiment of the present invention.

FIG. 5 is a flow chart of a method for lending digital service content according to an embodiment of the present invention. As shown in FIG. 5, the method for lending digital service content may include the following steps.

Step 501, the server receives a content lending request.

The content lending request carries an owner label of digital service content requested to be lent, the owner label includes an identifier of an owner that has the right to use and lend the digital service content, an identifier of the digital service content, and the lendable number of times of the digital service content.

Step 502: After determining that the lendable number of times of the digital service content is in an effective range, the server receives a borrower identifier specified by the owner and a lending period matching the borrower identifier.

Specifically, the lendable number of times of the digital service content being in the effective range may be that: the lendable number of times of the digital service content is greater than or equal to a first threshold value. In this embodiment, the first threshold value may be a positive number greater than or equal to 1, and this embodiment does not limit what the first threshold value is. Exemplarily, the first threshold value may be 1.

Step 503: The server generates the lending label of the digital service content according to the identifier of the owner, the borrower identifier specified by the owner, the identifier of the digital service content, and the lending period matching the borrower identifier.

Step 504: The server sends the lending label to the borrower.

In this embodiment, after receiving the content lending request and determining that the lendable number of times of the digital service content is in the effective range, the server may generate the lending label of the digital service content according to the identifier of the owner, the borrower identifier specified by the owner, the identifier of the digital service content, and the lending period matching the borrower identifier, and may send the lending label to the borrower specified by the owner, so as to implement the lending of digital service content in an electronic fashion, and implement copyright control for the digital service content after the digital service content is lent, thereby facilitating digital copyright management. In addition, in this embodiment, the limitation of the lending period and the lendable number of times of the digital service content lent is added, thereby enhancing the possessiveness of a purchaser and the appreciation of a borrower.

Figure 6:
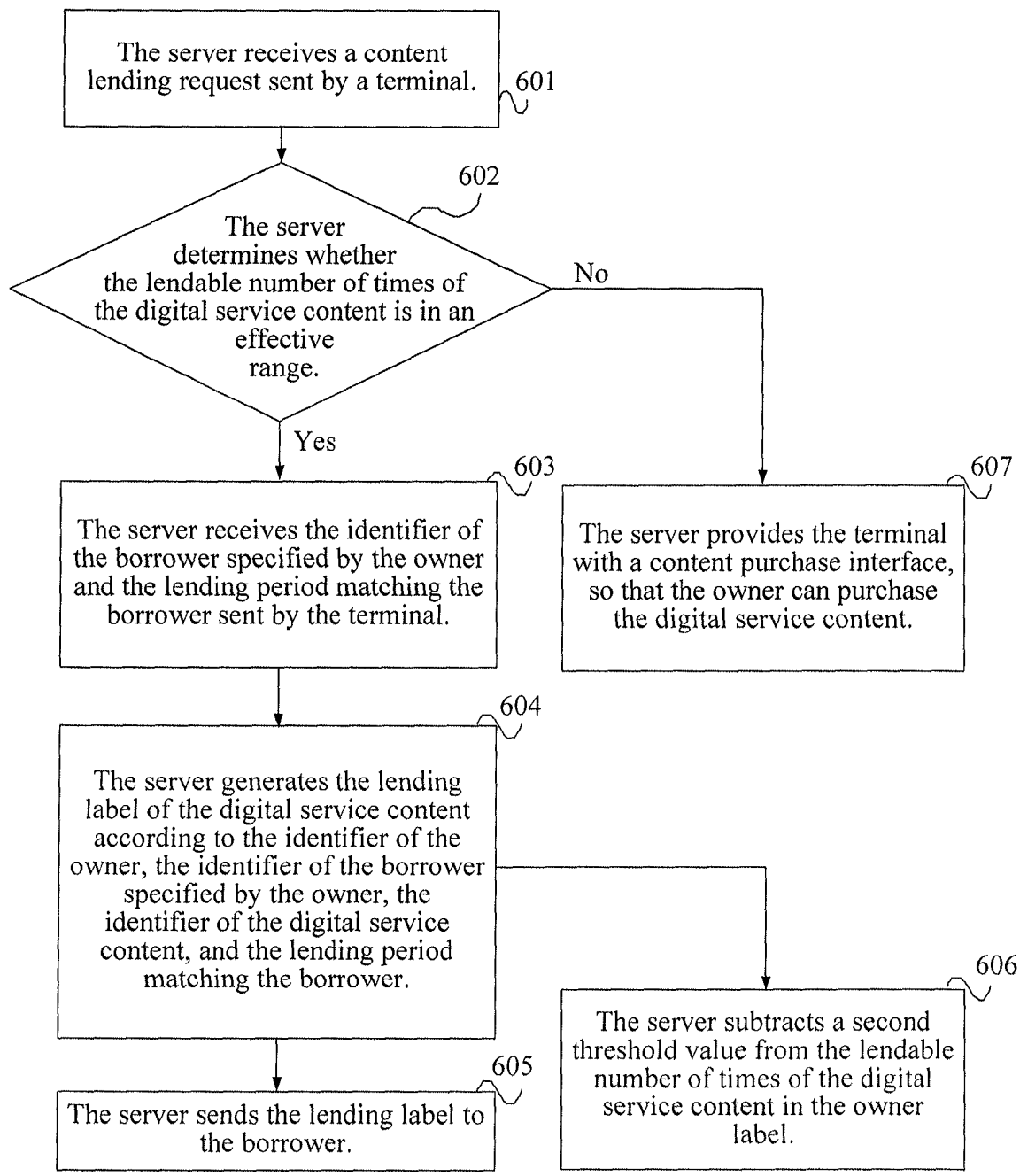
FIG. 6 is a flow chart of a method for lending digital service content according to another embodiment of the present invention.

FIG. 6 is a flow chart of a method for lending digital service content according to another embodiment of the present invention. As shown in FIG. 6, the method for lending digital service content may include the following steps.

Step 601: The server receives a content lending request sent by a terminal.

The content lending request carries an owner label of digital service content requested to be lent, and the owner label includes an identifier of an owner that has the right to use and lend the digital service content, an identifier of the digital service content, and the lendable number of times of the digital service content.

Step 602: The server determines whether the lendable number of times of the digital service content is in an effective range. If yes, execute step 603; and if the lendable number of times of the digital service content is not in an effective range, execute step 607.

Specifically, the lendable number of times of the digital service content being in the effective range may be that: the lendable number of times of the digital service content is greater than or equal to a first threshold value; and the lendable number of times of the digital service content being not in the effective range may be that: the lendable number of times of the digital service content is smaller than a first threshold value. In this embodiment, the first threshold value may be a positive number greater than or equal to 1, and this embodiment does not limit what the first threshold value is. Exemplarily, the first threshold value may be 1.

Step 603: The server receives the borrower identifier specified by the owner and the lending period matching the borrower, where the identifier and the lending period are sent by the terminal.

Step 604: The server generates the lending label of the digital service content according to the identifier of the owner, the borrower identifier specified by the owner, the identifier of the digital service content, and the lending period matching the borrower.

Step 605: The server sends the lending label to the borrower.

Step 606: The server subtracts a second threshold value from the lendable number of times of the digital service content in the owner label.

In this embodiment, the second threshold value may be a positive number, and this embodiment does not limit what the second threshold value is. Exemplarily, the second threshold value may be 1.

In this embodiment, step 605 and step 606 may be executed synchronously, and may also be executed successively, and this embodiment does not limit the sequence of executing step 605 and step 606.

Step 607: The server provides the terminal with a content purchase interface, so that the owner can purchase the digital service content.

With this embodiment, the lending of digital service content may be implemented in an electronic fashion, and copyright control for the digital service content may be implemented after the digital service content is lent, so as to facilitate digital copyright management. In addition, in this embodiment, the limitation of the lending period and the lendable number of times of the lent digital service content is added, thereby enhancing the possessiveness of a purchaser and the appreciation of a borrower.

The method provided in the present invention is introduced in the following through a specific example.

Figure 7:
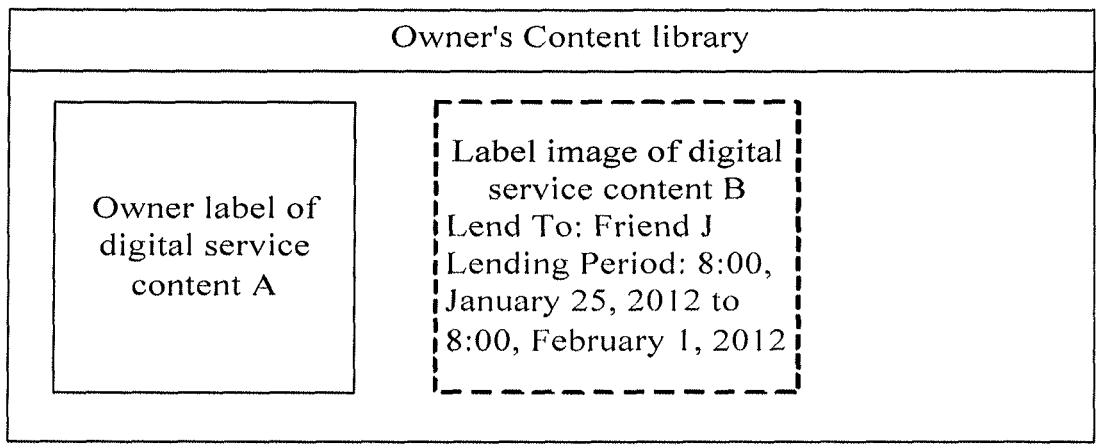
FIG. 7 is a schematic diagram of a content library according to an embodiment of the present invention.

After passing the verification of the server, the owner can see the digital service content owned by the owner, and the content library of the owner may be shown in FIG. 7. FIG. 7 is a schematic diagram of a content library according to an embodiment of the present invention. As shown in FIG. 7, the content library of the owner includes two labels, which are the owner label of digital service content A and the label image of digital service content B. The label image is the image of the owner label of digital service content B after the owner has lent digital service content B. The label image of digital service content B displays the borrower identifier specified by the owner and the lending period of digital service content B. In FIG. 7, the label image of digital service content B only displays the borrower identifier specified by the owner, for example, friend J, and the lending period of digital service content B, for example, from 8:00, Jan. 25, 2012 to 8:00, Feb. 1, 2012. In the present invention, the lending period of the digital service content has upper limit, and the upper limit is specified by a publisher of the digital service content, for example, 7 days by default; that is to say, the lending period of digital service content B set by the owner needs to be in 7 days starting from the day that the server generates the lending label of digital service content B.

After the owner clicks an owner label of digital service content in the content library of the owner, the server checks whether the owner has the right to use and lend the digital service content, in which the owner label includes the owner identifier, an identifier of the digital service content, and the lendable number of times of the digital service content. Furthermore, the owner label may further include the thumbnail of the digital service content and the title information of the digital service content. If the server determines that the owner has the right to use the digital service content, the owner can view the digital service content on line. In the present invention, the digital service content purchased by the owner is stored on the server and does not need to be downloaded locally. Definitely, the owner may also download the digital service content locally, and the downloaded digital service content is encrypted digital service content, and local decryption is performed only when the owner passes the examination performed on the right of the owner by the server, and then the owner can locally view the content. For the process of examining the right of the owner by the server, reference may be made to the process in the embodiment in FIGS. 3A and 3B of present invention, and details are no longer described here.

If the owner wants to lend digital service content, for example, to lend digital service content B to friend J, the owner may first select digital service content B and select friend J in a friend list through the friend list, and set a lending period of digital service content B, and then the server may generate a lending label of digital service content B, and send the lending label of digital service content B to friend J; specifically, the server may encrypt the lending label before sending the lending label to friend J. For the process of lending the digital service content, reference may be made to the process in the embodiment in FIG. 5 or FIG. 6 of the present invention, and details are no longer described here. After the owner has lent digital service content B, a label image of digital service content B remains in the content library of the owner and the image cannot be opened and viewed. However, two pieces of information are shown: the borrower identifier specified by the owner and the lending period of digital service content B.

The lending label may include an identifier of the owner, a borrower identifier specified by the owner, an identifier of the digital service content, and a lending period of the digital service content. Furthermore, the lending label may further include the thumbnail of the digital service content and the title information of the digital service content.

Figure 8:
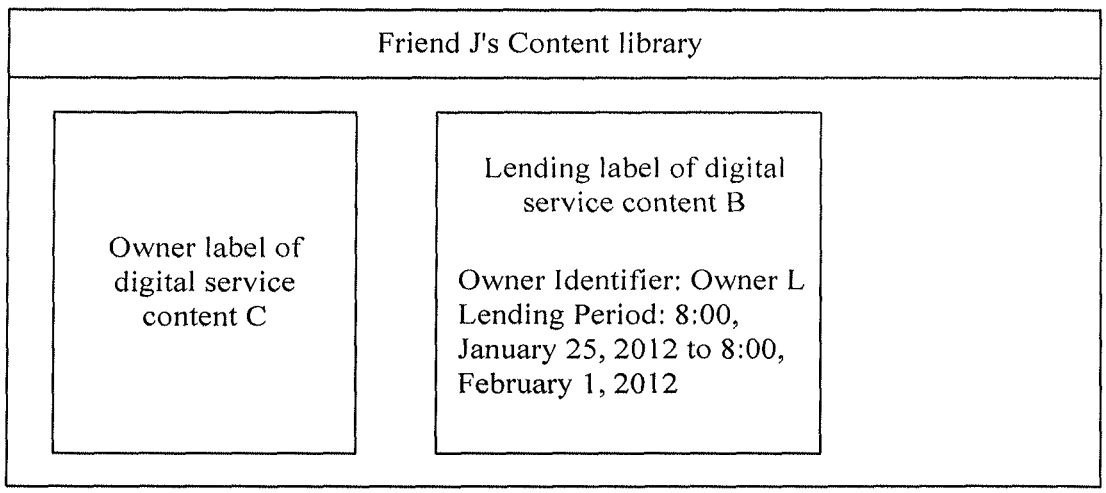
FIG. 8 is a schematic diagram of a content library according to another embodiment of the present invention.

After friend J receives the lending label of digital service content B sent by the server, the lending label may be presented together with the owner label of the digital service content purchased by friend J, but the lending label displays two more pieces of information, namely, the lending period and the identifier of the owner, than the owner label. For example, the content library of friend J may be shown in FIG. 8. FIG. 8 is a schematic diagram of a content library according to another embodiment of the present invention. As shown in FIG. 8, the content library of friend J includes two labels, which are the owner label of digital service content C and the lending label of digital service content B. In FIG. 8, the lending label of digital service content B only shows the lending period of digital service content B, for example, from 8:00, Jan. 25, 2012 to 8:00, Feb. 1, 2012, and shows the owner identifier of digital service content B, for example, owner L.

Friend J may download digital service content B locally to view, and similarly, the downloaded digital service content B is also encrypted digital service content, and local decryption can be performed only when friend J passes right examination performed by the server, and then friend J can locally view the content. For the process that the server examines the right of friend J, reference may be made to the process in the embodiment in FIG. 1, FIG. 2 or FIGS. 3A and 3B of the present invention, and details are no longer described here.

In the present invention, after friend J clicks the lending label of digital service content B, the server receives the lending label, and the server first checks the information in the lending label, which includes an identifier of the owner, a borrower identifier specified by the owner, a lending period matching the borrower, and the lendable number of times of digital service content B. If the owner indeed has the right to lend digital service content B, the lendable number of times of digital service content B is still in an effective range, the borrower is the borrower specified by the owner, and digital service content B is still in the lending period, friend J may view digital service content B on line. When any item fails to pass the check, friend J cannot view digital service content B.

If digital service content B is not in the lending period, the lending label of the digital service content may still remain in the content library of friend J and friend J may click the lending label to enter the content purchase interface of digital service content B to purchase it. For the process of purchasing digital service content, reference may be made to the process in FIG. 4 in the embodiment the present invention, and details are no longer described here.

If friend J has downloaded digital service content B before, after purchasing digital service content B, friend J can view the previously downloaded digital service content without downloading digital service content B again.

In the present invention, content is separated from authentication, the content access rights of different purchase levels are implemented through the owner label and the lending label. Through the lending label, the lending of the digital service content may be implemented, and the owner specifies the lending period for the borrower; and through the control of access time limit, only one of the owner label and the lending label can be used to access the digital service content at one time, which makes the digital service content rare and unique, and may increase the authorization charge and may also increase the purchase number of copies.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk or an optical disk.

Figure 9:
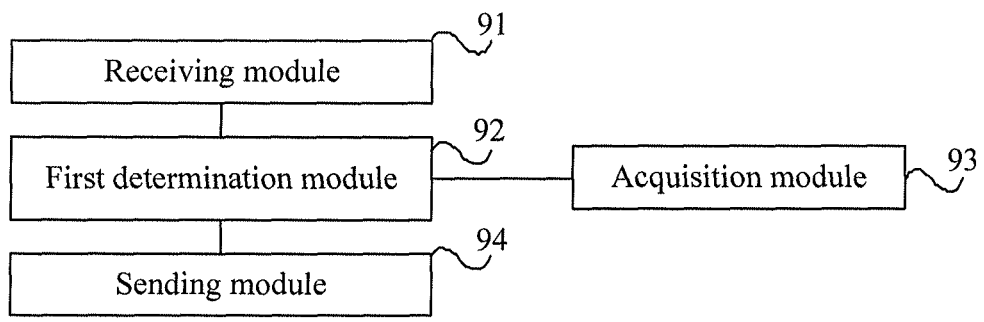
FIG. 9 is a schematic structural diagram of a server according to an embodiment of the present invention.

FIG. 9 is a schematic structural diagram of a server according to an embodiment of the present invention. In this embodiment, the server may implement the process in FIG. 1 in the embodiment of the present invention. As shown in FIG. 9, the server may include: a receiving module 91, a first determination module 92, an acquisition module 93, and a sending module 94.

The receiving module 91 is configured to receive a user request, in which the user request carries a user identifier and a label of the digital service content.

The first determination module 92 is configured to determine the type of the label; and after the acquisition module 93 acquires a borrower identifier in a lending label of the digital service content, determine whether the user identifier is the same as the borrower identifier; and after the acquisition module 93 acquires a lending period matching the borrower identifier in the lending label of the digital service content, determine whether the digital service content is in the lending period.

The acquisition module 93 is configured to acquire the borrower identifier in the lending label of the digital service content after the first determination module 92 determines that the label is the lending label of the digital service content; and acquire the lending period matching the borrower identifier in the lending label of the digital service content after the first determination module 92 determines that the user identifier is the same as the borrower identifier.

The sending module 94 is configured to send the digital service content to a terminal used by a user and identified by the user identifier after the first determination module 92 determines that the digital service content is in the lending period.

With this server, the lending of digital service content may be implemented in an electronic fashion, and copyright control for the digital service content may be implemented after the digital service content is lent, so as to facilitate digital copyright management. In addition, the limitation of the lending end date and the lendable number of times of the lent digital service content is added, thereby enhancing the possessiveness of a purchaser and the appreciation of a borrower.

Figure 10:
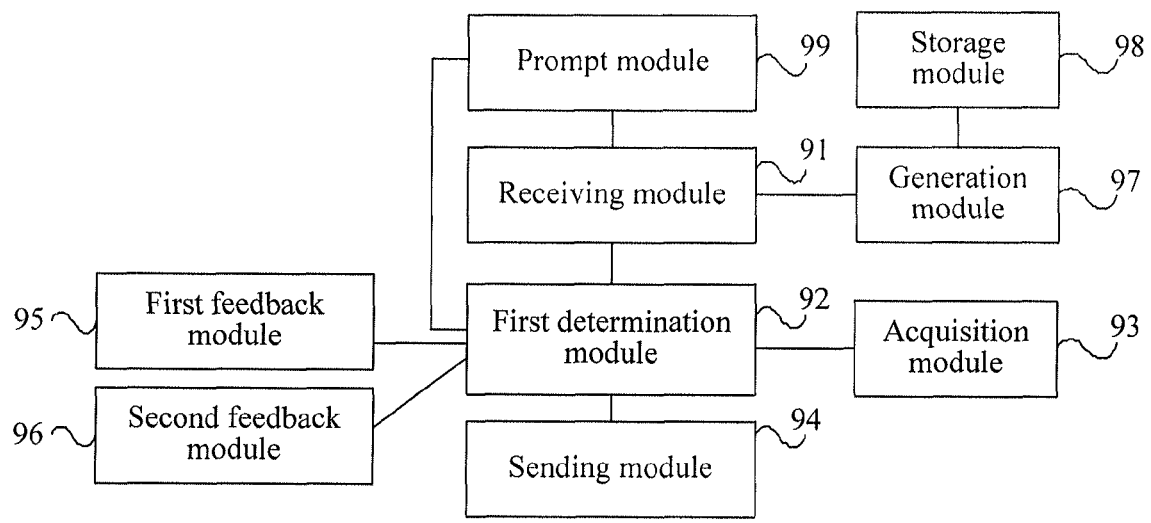
FIG. 10 is a schematic structural diagram of a server according to another embodiment of the present invention.

FIG. 10 is a schematic structural diagram of a server according to another embodiment of the present invention. In this embodiment, the server may implement the process in the embodiment in FIG. 1, FIG. 2 or FIGS. 3A and 3B of the present invention, and compared with the server in FIG. 9, the difference is that the server may further include:

a first feedback module 95, configured to feed back, to the terminal, information that the user does not have the right to borrow the digital service content, when the first determination module 92 determines that the user identifier is different from the borrower identifier, or the first determination module 92 determines that the digital service content is not in the lending period.

In this embodiment, the server may further include: a second feedback module 96.

The first determination module 92 is further configured to determine whether the user identifier is the same as the owner identifier included in the owner label of the digital service content after determining that the label is the owner label of the digital service content, in which the owner identifier includes an identifier of an owner that has the right to use and lend the digital service content; and determine whether the user has lent the digital service content after determining that the user identifier is the same as the owner identifier included in the owner label of the digital service content.

The sending module 94 is further configured to send the digital service content to the terminal after the first determination module 92 determines that the user has not lent the digital service content.

The second feedback module 96 is configured to feed back, to the terminal, information that the user has lent the digital service content after the first determination module 92 determines that the user has lent the digital service content.

Furthermore, the second feedback module 96 is further configured to feed back, to the terminal, information that the user does not have the right to use and lend the digital service content when the first determination module 92 determines that the user identifier is different from the owner identifier included in the owner label of the digital service content.

In this embodiment, the first determination module 92 is specifically configured to parse the label, determine that the label is the lending label of the digital service content when the label includes the borrower identifier; and determine that the label is the owner label of the digital service content when the label includes the identifier of the owner that has the right to use and lend the digital service content, but does not include the borrower identifier.

Alternatively, the first determination module 92 is specifically configured to parse the label, determine that the label is the lending label of the digital service content when the value of a label type field in the label is a first preset value; and determine that the label is the owner label of the digital service content when the value of a label type field in the label is a second preset value.

The first preset value and the second preset value may be manually set during specific implementation, and the present invention does not limit what the first preset value and the second preset value are, as long as the second preset value and the first preset value are different. For example, the first preset value may be "0", whereas the second preset value may be "1"; that is to say, when the value of the label type field is "0", the server may determine that the label is the lending label, and when the value of the label type field is "1", the server may determine that the label is the owner label. Alternatively, one of the first preset value and the second preset value may also be set to null, and the other is not null. For example, it is assumed that the first preset value is null, the second preset value is not null. Here, it is assumed that the second preset value is "1", when the value of the label type field is null, the server may determine that the label is the lending label, and when the value of the label type field is "1", the server may determine that the label is the owner label.

Furthermore, the server may further include: a generation module 97, a storage module 98, and a prompt module 99.

The prompt module 99 is configured to prompt the user to execute a process for purchasing the digital service content, when the first determination module 92 determines that the user identifier is different from the borrower identifier, or the first determination module 92 determines that the digital service content is not in the lending period, or the first determination module 92 determines that the user identifier is different from the owner identifier included in the owner label of the digital service content.

The receiving module 91 is further configured to receive a purchase request sent by the user, in which the purchase request is used for requesting purchasing the digital service content, and the purchase request carries the user identifier; and receive the lendable number of times of the digital service content, where the lendable number of times is set by the user.

The generation module 97 is configured to generate the owner label of the digital service content according to the identifier of the digital service content, the lendable number of times of the digital service content, and the user identifier.

The storage module 98 is configured to store the owner label of the digital service content generated by the generation module 97 in a content library of the user.

With this server, the lending of digital service content may be implemented in an electronic fashion, and copyright control for the digital service content may be implemented after the digital service content is lent, so as to facilitate digital copyright management. In addition, the limitation of the lending period and the lendable number of times of the lent digital service content is added, thereby enhancing the possessiveness of a purchaser and the appreciation of a borrower. Also, after the purchaser has lent the digital service content, the purchaser cannot use the digital service content in the lending period, thereby enhancing the discretion of the purchaser for the lending.

Figure 11:
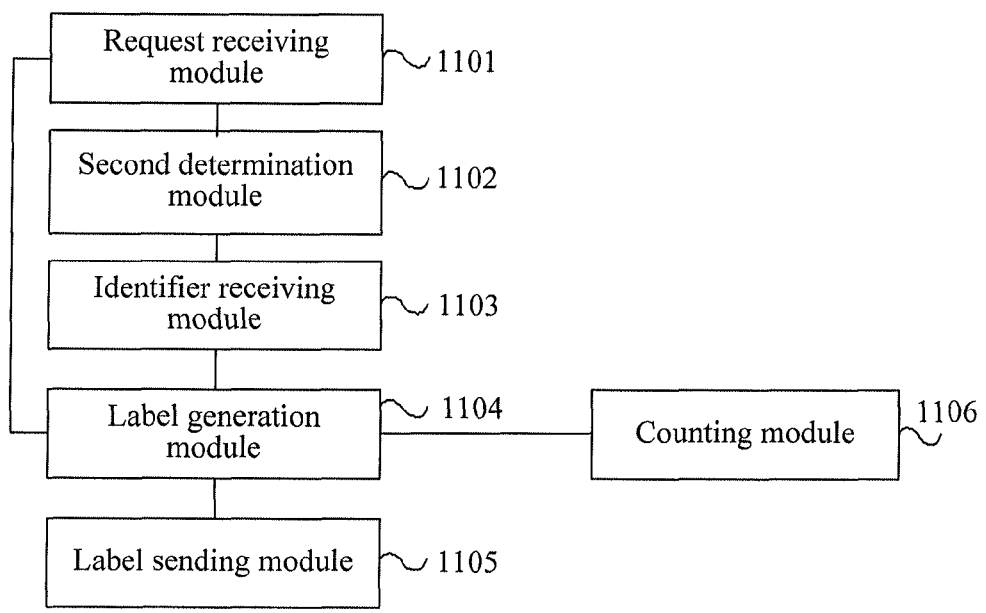
FIG. 11 is a schematic structural diagram of a server provided in yet another embodiment of the present invention.

FIG. 11 is a schematic structural diagram of a sever according to yet another embodiment of the present invention. In this embodiment, the server may implement the process in the embodiment in FIG. 5 or FIG. 6 of the present invention. As shown in FIG. 11, the server may include: a request receiving module 1101, a second determination module 1102, an identifier receiving module 1103, a label generation module 1104, and a label sending module 1105.

The request receiving module 1101 is configured to receive a content lending request, in which the content lending request carries an owner label of digital service content requested to be lent, the owner label includes an identifier of an owner that has the right to use and lend the digital service content, an identifier of the digital service content, and the lendable number of times of the digital service content.

The second determination module 1102 is configured to determine that the lendable number of times of the digital service content is in an effective range.

The identifier receiving module 1103 is configured to receive a borrower identifier specified by the owner and a lending period matching the borrower identifier after the second determination module 1102 determines that the lendable number of times of the digital service content is in the effective range.

The label generation module 1104 is configured to generate a lending label of the digital service content according to the owner identifier, the borrower identifier specified by the owner, the identifier of the digital service content, and the lending period matching the borrower identifier.

The label sending module 1105 is configured to send the lending label generated by the label generation module 1104 to the borrower.

Specifically, the second determination module 1102 is specifically configured to determine that the lendable number of times of the digital service content is greater than or equal to a first threshold value. In this embodiment, the first threshold value may be a positive number greater than or equal to 1, this embodiment does not limit what the first threshold value is, and exemplarily, the first threshold value may be 1.

Furthermore, in an implementation manner of this embodiment, the server may further include:

a counting module 1106, configured to subtract a second threshold value from the lendable number of times of the digital service content in the owner label after the label generation module 1104 generates the lending label of the digital service content. In this embodiment, the second threshold value may be a positive number, this embodiment does not limit what the second threshold value is, and exemplarily, the second threshold value may be 1.

With this server, the lending of digital service content may be implemented in an electronic fashion, and copyright control for the digital service content may be implemented after the digital service content is lent, so as to facilitate digital copyright management. In addition, the limitation of the lending period and the lendable number of times of the lent digital service content is added, thereby enhancing the possessiveness of a purchaser and the appreciation of a borrower.

It should be understood by persons skilled in the art that the accompanying drawings are merely schematic diagrams of an exemplary embodiment, and modules or processes in the accompanying drawings are not necessarily required in implementing the present invention.

It should be understood by persons skilled in the art that, modules in a device according to an embodiment may be distributed in the device of the embodiment according to the description of the embodiment, or be correspondingly changed and disposed in one or more devices different from this embodiment. The modules of the above embodiment may be combined into one module, or further divided into a plurality of sub-modules.

Finally, it should be noted that the embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some or all the technical features in the technical solutions, as long as such modifications or replacements do not depart from the scope of the technical solutions of the embodiments of the present invention.

What is claimed is:

1. A method for sending digital service content, comprising:

receiving, by a server, a user request, wherein the user request carries a user identifier and a label of digital service content;

determining, by the server, a type of the label;

if the label is a lending label of the digital service content, acquiring, by the server, a borrower identifier in the lending label of the digital service content; and determining whether the user identifier is the same as the borrower identifier;

if the user identifier is the same as the borrower identifier, acquiring, by the server, a lending period matching the borrower identifier in the lending label of the digital service content, and determine whether the digital service content is in the lending period; and if the digital service content is in the lending period, sending, by the server, the digital service content to a terminal used by a user and identified by the user identifier.

2. The method according to claim 1, further comprising:

if the user identifier is different from the borrower identifier, or the digital service content is not in the lending period, feeding back, by the server to the terminal, information that the user does not have the right to borrow the digital service content.

3. The method according to claim 2, further comprising:

if the user identifier is different from the borrower identifier, or the digital service content is not in the lending period, or the user identifier is different from the owner identifier comprised in the owner label of the digital service content, prompting, by the server, the user to execute a process for purchasing the digital service content.

4. The method according to claim 3, after the prompting, by the server, the user to execute the process for purchasing the digital service content, further comprising:

receiving, by the server, a purchase request sent by the user, wherein the purchase request is used for requesting purchasing the digital service content, and the purchase request carries the user identifier; and receiving the lendable number of times of the digital service content, wherein the lendable number of times is set by the user; and generating, by the server, the owner label of the digital service content according to an identifier of the digital service content, the lendable number of times of the digital service content, and the user identifier, and storing the owner label of the digital service content in a content library of the user.

5. The method according to claim 1, after the determining, by the server, the type of the label, further comprising:
   if the label is an owner label of the digital service content, determining, by the server, whether the user identifier is the same as the owner identifier comprised in the owner label of the digital service content, wherein the owner identifier comprises an identifier of an owner that has the right to use and lend the digital service content;
   if the user identifier is the same as the owner identifier comprised in the owner label of the digital service content, determining, by the server, whether the user has lent the digital service content;
   if the user has not lent the digital service content, sending, by the server, the digital service content to the terminal; and
   if the user has lent the digital service content, feeding back, by the server to the terminal, information that the user has lent the digital service content.

6. The method according to claim 5, further comprising:
   if the user identifier is different from the owner identifier comprised in the owner label of the digital service content, feeding back, by the server to the terminal, information that the user does not have the right to use and lend the digital service content.

7. The method according to claim 1, wherein the determining, by the server, the type of the label, comprises:
   parsing, by the server, the label;
   when the label comprises the borrower identifier, determining, by the server, that the label is the lending label of the digital service content; or, when a value of a label type field in the label is a first preset value, determining that the label is the lending label of the digital service content;
   when the label comprises the identifier of the owner that has the right to use and lend the digital service content, but does not comprise the borrower identifier, determining, by the server, that the label is the owner label; or, when the value of the label type field in the label is a second preset value, determining that the label is the owner label of the digital service content.

8. A method for lending digital service content, comprising:
   receiving, by a server, a content lending request, wherein the content lending request carries an owner label of digital service content requested to be lent, the owner label comprises an identifier of an owner that has the right to use and lend the digital service content, an identifier of the digital service content, and the lendable number of times of the digital service content;
   after determining that the lendable number of times of the digital service content is in an effective range, receiving, by the server, a borrower identifier specified by the owner, and a lending period matching the borrower identifier;
   generating, by the server, a lending label of the digital service content according to the identifier of the owner, the borrower identifier specified by the owner, the identifier of the digital service content, and the lending period matching the borrower identifier; and
   sending, by the server, the lending label to the borrower.

9. The method according to claim 8, wherein, the lendable number of times of the digital service content being in the effective range comprises: the lendable number of times of the digital service content is greater than or equal to a first threshold value.

10. The method according to claim 8, after the generating the lending label of the digital service content, further comprising:
    subtracting, by the server, a second threshold value from the lendable number of times of the digital service content in the owner label.

11. A server, comprising: a program processing hardware which executes program codes stored in a memory to configure the server to:
    receive a user request, wherein the user request carries a user identifier and a label of digital service content;
    determine a type of the label; and after the acquisition module acquires a borrower identifier in a lending label of the digital service content,
    determine whether the user identifier is the same as the borrower identifier; and after acquiring a lending period matching the borrower identifier in the lending label of the digital service content, determine whether the digital service content is in the lending period;
    acquire the borrower identifier in the lending label of the digital service content after determining that the label is the lending label of the digital service content; and
    acquire the lending period matching the borrower identifier in the lending label of the digital service content after determining that the user identifier is the same as the borrower identifier; and
    send the digital service content to a terminal used by a user and identified by the user identifier after determining that the digital service content is in the lending period.

12. The server according to claim 11, further configured to:
    feed back to the terminal, information that the user does not have the right to borrow the digital service content, when the determining that the user identifier is different from the borrower identifier, or, determining that the digital service content is not in the lending period.

13. The server according to claim 12, further configured to:
    prompt the user to execute a process for purchasing the digital service content, when one of the following takes place:
    determining that the user identifier is different from the borrower identifier, or
    determining that the digital service content is not in the lending period, or
    determining that the user identifier is different from the owner identifier comprised in the owner label of the digital service content.

14. The server according to claim 13, further configured to:
    receive a purchase request sent by the user, wherein the purchase request is used for requesting purchasing the digital service content, and the purchase request carries the user identifier; and receive the lendable number of times of the digital service content, wherein the lendable number of times is set by the user;
    generate the owner label of the digital service content according to an identifier of the digital service content, the lendable number of times of the digital service content, and the user identifier; and
    store the owner label of the digital service content generated by the generation module in a content library of the user.

15. The server according to claim 11, further configured to after determining that the label is an owner label of the digital service content, determine whether the user identifier is the same as the owner identifier comprised in the owner label of the digital service content, wherein the owner identifier comprises an identifier of an owner that has the right to use and lend the digital service content; and after determining that the user identifier is the same as the owner identifier comprised in the owner label of the digital service content, determine whether the user has lent the digital service content;

send the digital service content to the terminal after determining that the user has not lent the digital service content; and feed back to the terminal, information that the user has lent the digital service content after determining that the user has lent the digital service content.

16. The server according to claim 15, further configured to:
feed back to the terminal, information that the user does not have the right to use and lend the digital service content when determining that the user identifier is different from the owner identifier comprised in the owner label of the digital service content.

17. The server according to claim 11, further configured to:
parse the label, determine that the label is the lending label of the digital service content when the label comprises the borrower identifier; and determine that the label is the owner label of the digital service content when the label comprises the identifier of the owner that has the right to use and lend the digital service content, but does not comprise the borrower identifier; or,
parse the label, determine that the label is the lending label of the digital service content when a value of a label type field in the label is a first preset value; determine that the label is the owner label of the digital service content when the value of the label type field in the label is a second preset value.

18. A server, comprising: a program processing hardware which executes program codes stored in a memory to configure the server to:
receive a content lending request, wherein the content lending request carries an owner label of digital service content requested to be lent, the owner label comprises an identifier of an owner that has the right to use and lend the digital service content, an identifier of the digital service content, and the lendable number of times of the digital service content;
determine that the lendable number of times of the digital service content is in an effective range;
receive a borrower identifier specified by the owner and a lending period matching the borrower identifier after the second determination module determines that the lendable number of times of the digital service content is in the effective range;
generate a lending label of the digital service content according to the identifier of the owner, the borrower identifier specified by the owner, the identifier of the digital service content, and the lending period matching the borrower identifier; and
send the lending label generated by the label generation module to the borrower.

19. The server according to claim 18, configured to:
determine that the lendable number of times of the digital service content is greater than or equal to a first threshold value.

20. The server according to claim 18, configured to:
subtract a second threshold value from the lendable number of times of the digital service content in the owner label after the label generation module generates the lending label of the digital service content.

* * * * *